March 12, 1963 W. H. MARSHALL, JR 3,081,268
AMMONIA SYNTHESIS GAS PROCESS
Filed Feb. 7, 1961 2 Sheets-Sheet 1

INVENTOR.
WALTON H. MARSHALL, JR.
BY
Davis, Hoxie, Faithfull & Hapgood
ATTORNEYS.

3,081,268
AMMONIA SYNTHESIS GAS PROCESS
Walton H. Marshall, Jr., Laurel Grove, Downings, Va.
Filed Feb. 7, 1961, Ser. No. 87,702
9 Claims. (Cl. 252—376)

My invention is an improved process for the production of synthsis gas for use in the manufacture of synthetic ammonia.

In producing synthetic ammonia from air, as a source of nitrogen, and hydrocarbons, as a source of hydrogen, the hydrocarbon, for example methane, is converted at elevated temperatures and pressures to hydrogen by the following principal reactions:

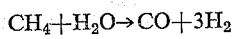
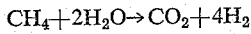

Customarily, this conversion is carried out by using a "steam to carbon ratio" of 2.0 to 3.5. Such term means and is used in the specification and claims to mean the number of atoms of oxygen contained in the steam for each atom of carbon contained in the hydrocarbon.

I have found unexpectedly that operating economies and other advantages result when a steam to carbon ratio in the range of 4.0 to 8.0 is used.

Figure 1:
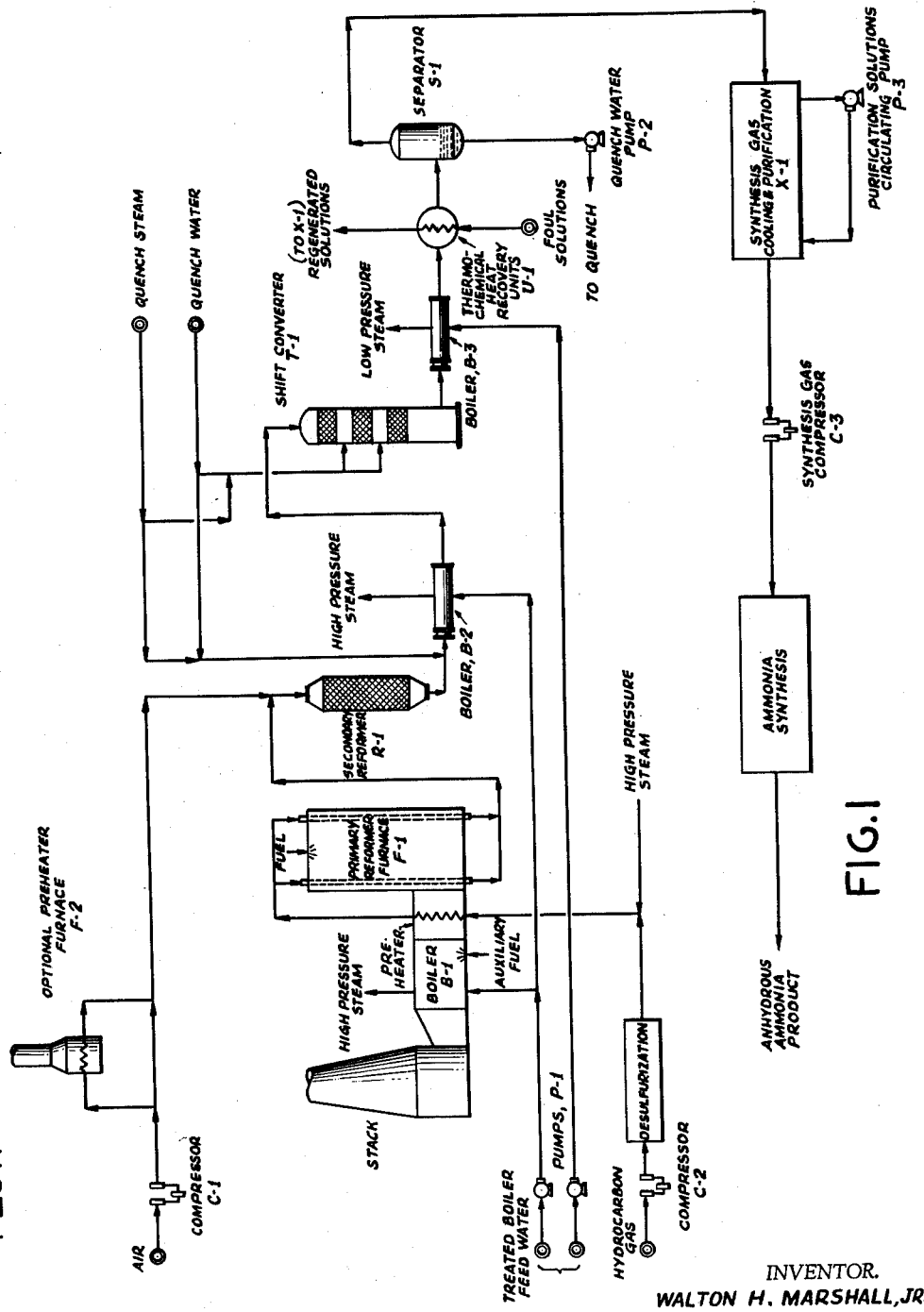
Figure 2:
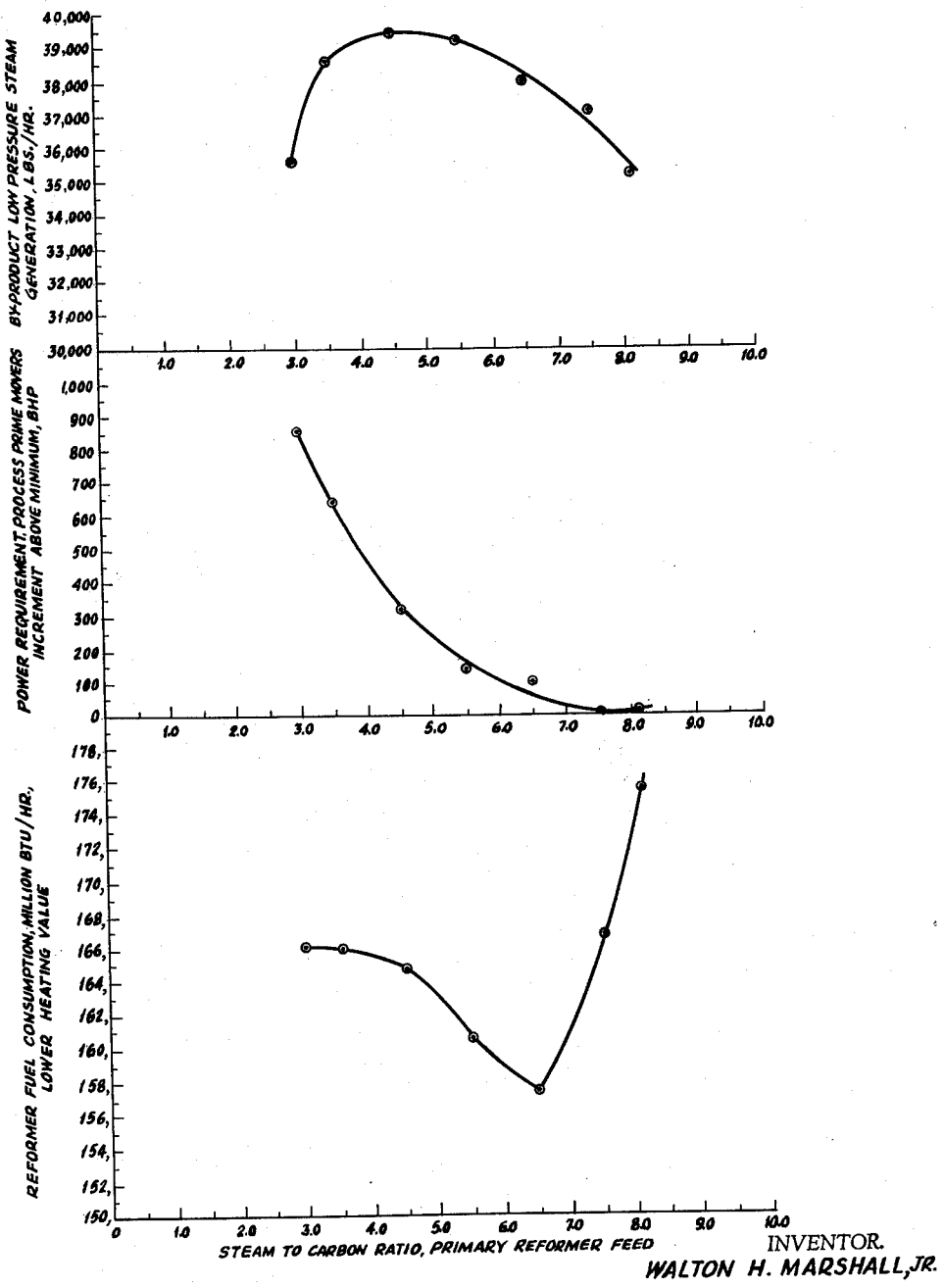

For a better understanding of the invention, reference may be had to the accompanying drawings, in which:

FIGURE 1 is a generalized flowsheet of the process, including methods which are or may be employed for the recovery of waste heat; and FIGURE 2 shows graphically the advantages of my invention as set forth below numerically in Table I.

Referring to FIGURE 1, normally gaseous hydrocarbons, such as natural gas which is predominantly methane, are compressed and are desulfurized where necessary to protect catalysts used in subsequent steps. A waste heat boiler B-1 is used to generate steam from the furnace combustion gases before they are exhausted to the stack. This boiler is usually large enough to effect an overall fuel efficiency in the primary reformer F-1 of 80% or slightly higher. Supplementary fuel can be fired in this waste heat boiler in order to maintain a balance between production and consumption of high pressure steam used in the reforming process.

The mixture of hydrocarbon and steam is distributed to the reformer furnace tubes which are externally fired. These tubes contain suitable nickel-bearing catalysts which convert the hydrocarbon to hydrogen and carbon oxides. With sufficient catalyst volume in the reformer furnace F-1, exit gas composition corresponds very closely to the chemical equilibria involved. In the normal exit temperature range of 1350° to 1650° F., and at pressures of 50 to 200 p.s.i., 65 to 85% of the hydrocarbons are converted to hydrogen and carbon oxides. Heavier hydrocarbons, from ethane to pentanes and heavier, are substantially completely destroyed in the primary reforming step, so the equilibria involved are confined to residual methane, hydrogen, steam and carbon oxides, in accordance with the above two equations.

Ammonia synthesis gas requires a ratio of 3 moles of hydrogen for each mole of nitrogen and the nitrogen is usually admitted to the process in the form of compressed air, which is mixed with the primary reformer exit gas in the secondary reformer R-1, a reaction vessel which also contains a suitable nickel-bearing catalyst. On FIGURE 1 I have shown an optional air preheater F-2, the unique advantages of which will be described later.

In the secondary reformer the oxygen in the air is completely destroyed, in highly exothermic reactions, by combustion of hydrogen, carbon monoxide, and residual methane. This combustion provides the energy to elevate the total process stream to 1650° F. to 2000° F., at which temperature residual methane is largely destroyed, thus keeping inerts in the ammonia synthesis gas to a low value. In a practical operating plant overall methane conversion is more than 95%, and frequently the operating conditions are adjusted to achieve more than 99% conversion.

The temperature of the secondary reformer outlet stream is reduced by quenching with steam, water or a combination of the two. A combination is ordinarily employed, as it permits control of relative quantities of water vapor to dry gas in the shift converter T-1, which follows. Following quench, the secondary reformer gases may or may not pass through a waste heat boiler B-2 for the production of steam. In some plants quenching is done to about 1100° to 1200° F. with a boiler following. In others, the secondary reformer outlet stream is quenched directly to the shift converter T-1 entrance temperature of about 600° to 800° F. Either method may be used in my improved process.

In the shift converter T-1 most of the carbon monoxide is converted to carbon dioxide in accordance with the reaction $H_2O + CO \rightleftharpoons CO_2 + H_2$. This reaction is favored by an excess of steam, and it is desirable to adjust operating conditions so that there is more than 90% overall conversion to carbon dioxide so as to minimize the later removal of carbon monoxide. I prefer to operate with more than 95% overall conversion to carbon dioxide, although my improved process is not limited to this range. The shift reaction is exothermic and it is customary to use a plurality of catalyst beds with intermediate injection of steam or water or both in order to maintain the desirable temperature conditions in the range of 600° F. to 800° F. Conversion to carbon dioxide is favored at the lower temperature.

The shift converter exit stream is composed of crude synthesis gas and surplus steam. It is important to recover efficiently as much heat as possible from this stream, especially the latent heat of condensation of the surplus steam. In modern plants this heat is used, as shown on FIGURE 1, to regenerate the solutions, such as aqueous monoethanolamine, potassium carbonate and ammoniacal copper liquor, used to remove carbon dioxide and carbon monoxide from the crude synthesis gas at X-1.

FIGURE 1 shows additional waste heat recovery equipment, in the form of a low pressure steam generator B-3, in addition to the thermochemical heat recovery. This form of additional heat recovery has not heretofore been employed for reasons which will be described later.

Following the step of thermochemical heat recovery, crude synthesis gas is cooled to remove any remaining water vapor and then is purified at X-1 by removal of carbon dioxide and carbon monoxide. After the purification, the synthesis gas is compressed by synthesis gas compressors C-3, to full synthesis pressure, usually 300 atmospheres or higher.

The earliest plants operated at low steam to carbon ratios in the primary reformer F-1 in the range of 2.00 to 2.25. While this meant low fuel use in the reformer radiant section, the process was relatively inefficient, as it required the use of low process operating pressure, resulted in a relatively low conversion of CO to $CO_2$ (less than 90%), and permitted little heat to be recovered from the shift converter outlet stream. In recent years, the production of synthesis gas has become much more efficient by (a) increasing that ratio to about 3.00 to 3.50, and (b) simultaneously increasing the operating pressure at the secondary reformer outlet to the range of 150 p.s.i.a. to 200 p.s.i.a. These changes in the reforming process:

(1) Produce a chemical benefit in the form of higher conversion of carbon monoxide to carbon dioxide in the shift converter.

(2) Produce a thermochemical benefit, in the form of better waste heat recovery from the shift converter outlet. In the most modern plants, a steam to carbon ratio of 3.00 to 3.50 in primary reforming results in substantially an exact balance between thermochemical requirement and heat availability in the shift converter effluent. In other words, the process provides, in the form of waste heat recovery, sufficient energy to permit removal of $CO_2$ and CO from the synthesis gas without introduction of thermal energy from an external source. No additional heat, beyond the thermochemical requirement, is recovered from the shift converter outlet stream.

(3) Produce a benefit in reducing the overall compression horsepower requirement since in the course of the reforming reactions the volume of synthesis gas is increased in relation to the combined volumes of feed air and hydrocarbon.

I have discovered that there is benefit to be obtained in still further increasing steam usage in the primary reforming step. Without increasing the extent of CO conversion, and without increasing the amount of thermochemical energy recovery, increasing steam usage in reforming produces a substantial benefit in the relationship between fuel consumption and horsepower requirements. The benefit results from an intricate balance between waste steam recovery, fuel usage and power requirements. This result is surprising and unexpected when one considers that surplus steam for power purposes is generated by transfer of heat through two surfaces instead of only one, as in a steam boiler, and that waste steam generation is accomplished in the presence of large volumes of fixed gases which lower the level at which the energy can be recovered in usable form.

In order to demonstrate this it is necessary to hold constant a large number of operating conditions. Set forth in Table I below are the results of calculations, for a 200 ton per day anhydrous ammonia plant using the process of FIGURE 1, to show the beneficial effect of increasing the steam to carbon ratio in the primary reformer (F-1, FIGURE 1) when other operating conditions are fixed.

Those calculations have been made upon the following bases:

(1) Composition of synthesis gas and the degree of thermochemical heat recovery are constant.

(2) The primary reformer F-1 is designed for 80% efficiency overall (based upon the lower heating value of the fuel fired) with 40% efficiency in the radiant section.

(3) The mixture of gas and steam fed to primary reforming is preheated to 600° F.

(4) Secondary reformer R-1 outlet temperature is 1750° F. and operating pressure is adjusted to result in constant hydrocarbon conversion for all cases.

(5) Quench temperature at secondary reformer outlet is 1150° F.

(6) The ratio of steam to dry gas at the outlet of the shift converter T-1 remains constant, and catalyst volume is sufficient to give 700° F. equilibrium gas composition.

(7) All heat in the shift converter T-1 effluent is recovered down to a level of 270° F.

(8) Carbon dioxide is removed by monoethanolamine solution.

(9) Residual carbon monoxide is removed by methanation.

(10) High pressure steam is generated at a pressure of 50 p.s.i. above secondary reformer outlet pressure.

(11) Air is compressed to a pressure of 25 p.s.i. above secondary reformer outlet pressure.

(12) Natural gas is compressed to a pressure of 35 p.s.i. above secondary reformer outlet pressure.

(13) The pressure drop in all equipment from secondary reformer outlet to the first stage suction of the synthesis gas compressors C-3 is 35 p.s.i.

(14) The pressure drop between secondary reformer outlet and thermochemical heat recovery equipment is 15 p.s.i.

(15) Temperature of the steam generated in the low pressure waste heat boiler B-3 is 15° F. below the temperature of the process stream entering the thermochemical heat recovery equipment.

While it is necessary for the purpose of comparison to assume the same operating conditions in each of the examples in Table I, my invention is of course not limited to those particular conditions.

Having fixed the operating conditions as stated above, it is possible to evaluate the effect of the primary variable, steam to carbon ratio in the feed gas, upon the dependent variables (1) fuel consumption, (2) horsepower requirement for process prime movers, (3) operating pressure, secondary reformer outlet, and (4) relative quantities of steam and water used in quenching.

The results of the calculations set forth numerically in Table I are also shown graphically in FIGURE 2. The lower curve in FIGURE 2 shows that fuel consumption passes through a minimum at a steam to carbon ratio of about 6.5. The sharp inversion occurs at the point where firing of auxiliary fuel is not required to maintain a balance between production and consumption of high pressure steam in the reforming process.

The center curve shows that installed brake horsepower of process prime movers passes through a minimum at a steam to carbon ratio of about 7.5. Beyond this point the additional horsepower required by process pumps more than offsets the savings in compressor horsepower.

The upper curve shows that the production of byproduct steam from waste heat boiler B-3, reflecting waste heat recovery above the thermochemical requirement, passes through a maximum at steam to carbon ratios in the order of 4.0 to 5.0.

It cannot be said that any one steam to carbon ratio prior to primary reforming is absolutely the best, since the three optima occur at slightly different points. All optima lie, however, between the ratios of 4.0 and 8.0. The selection of the best operating point requires that an economic balance be made between the cost of fuel, the value of steam, and the installed cost of mechanical equipment. In all cases, however, the mean optimum will occur when that ratio is about 4.0 to about 8.0, and usually between 4.5 and 7.0.

The data of Table I, as previously mentioned, have been derived after fixing a large number of process operating conditions. There are an infinite number of possible variations in these conditions, and each variation will, of course, result in a slight shifting of the locations of the various optima. I have found, however, after exhaustive examination of the subject, that the optima will remain

TABLE I

*Effect of Atomic Ratio of Steam to Carbon in Primary Reformer on Efficiency of Anhydrous Ammonia Production*

[Basis: 200 tons per day anhydrous ammonia]

| Example | A | B | C | D | E | F | G |
|---|---|---|---|---|---|---|---|
| Primary variable, steam to carbon ratio | 3.00 | 3.50 | 4.50 | 5.50 | 6.50 | 7.50 | 8.15 |
| Dependent variables: | | | | | | | |
| Secondary reformer outlet pressure, p.s.i.a. | 165 | 215 | 290 | 369 | 463 | 566 | 645 |
| High pressure steam, p.s.i.a. | 215 | 265 | 340 | 419 | 513 | 616 | 695 |
| Low pressure steam, p.s.i.a. | 75 | 99 | 130 | 169 | 218 | 268 | 296 |
| Quench steam, lbs./hr. | 76,300 | 70,700 | 53,300 | 37,900 | 23,800 | 11,300 | 3,200 |
| Quench water, lbs./hr. | | 1,347 | 10,430 | 17,350 | 22,500 | 27,100 | 29,700 |
| Quench water temperature, °F. | 270 | 270 | 270 | 270 | 270 | 270 | 270 |
| High pressure steam from B-1, lbs./hr. | 79,800 | 76,900 | 69,300 | 62,400 | 55,400 | 59,000 | 62,500 |
| High pressure steam from B-2, lbs./hr. | 21,900 | 23,400 | 21,700 | 21,800 | 23,100 | 25,600 | 27,300 |
| Total high pressure steam generated, lbs./hr. | 101,700 | 100,300 | 91,000 | 84,200 | 78,500 | 84,600 | 89,800 |
| High pressure steam consumed, lbs./hr. | 101,700 | 100,300 | 91,000 | 84,200 | 78,500 | 74,400 | 71,800 |
| Surplus high pressure steam, lbs./hr. | | | | | | 10,200 | 18,000 |
| Low pressure steam generated, lbs./hr. | 35,600 | 38,600 | 39,400 | 39,200 | 38,000 | 37,100 | 35,200 |
| Radiant section fuel, MM B.t.u./hr. (LHV) | 114.8 | 121.5 | 134.8 | 144.3 | 157.2 | 166.8 | 175.5 |
| Auxiliary Fuel, MM B.t.u./hr. (LHV) | 51.4 | 44.6 | 30.0 | 16.3 | 0.3 | | |
| | 166.2 | 166.1 | 164.8 | 160.6 | 157.5 | 166.8 | 175.5 |
| Power requirements, process prime movers: | | | | | | | |
| Air compressor, BHP | 1,110 | 1,230 | 1,310 | 1,410 | 1,520 | 1,604 | 1,687 |
| Natural gas compressor, BHP | 785 | 860 | 927 | 985 | 1,050 | 1,105 | 1,156 |
| Synthesis gas compressor, BHP | 4,910 | 4,460 | 3,940 | 3,550 | 3,270 | 2,950 | 2,760 |
| Amine circulating pump, BHP | 95 | 123 | 165 | 208 | 260 | 319 | 362 |
| Boiler feed pumps, BHP | 40 | 49 | 58 | 66 | 76 | 97 | 114 |
| Quench water pump, BHP | | 1 | 3 | 5 | 6 | 7 | 8 |
| Total | 6,940 | 6,723 | 6,403 | 6,224 | 6,182 | 6,082 | 6,087 |
| Increment from minimum, BHP | +858 | +641 | +321 | +142 | +100 | 0 | +5 |
| Primary constant factors: | | | | | | | |
| Crude syn. gas, percent $H_2$ | 61.70 | 61.70 | 61.70 | 61.70 | 61.70 | 61.70 | 61.70 |
| Crude syn. gas, percent $CO_2$ | 17.80 | 17.80 | 17.80 | 17.80 | 17.80 | 17.80 | 17.80 |
| Crude syn. gas, percent $CO$ | 0.37 | 0.37 | 0.37 | 0.37 | 0.37 | 0.37 | 0.37 |
| Crude syn. gas, percent $CH_4$ | 0.18 | 0.18 | 0.18 | 0.18 | 0.18 | 0.18 | 0.18 |
| Steam to dry gas ratio, shift outlet | 1.96 | 1.96 | 1.96 | 1.96 | 1.96 | 1.96 | 1.96 |
| Thermochemical heat recovery, MM B.t.u./hr. | 53.1 | 53.1 | 53.1 | 53.1 | 53.1 | 53.1 | 53.1 | within the range of about 4.00 to about 8.00. In other words, the optimum plant for production of ammonia synthesis gas from gaseous hydrocarbons by (a) primary reforming with steam, (b) secondary reforming with air, and (c) shift conversion, will result when the steam to carbon ratio in the primary reformer is from about 4.00 to about 8.00, and where operating pressure at the secondary reformer outlet is between 270 p.s.i.a. and 650 p.s.i.a.

FIGURE 1 shows an optional air preheater furnace F-2. The use of this furnace, preheating air between 300° F. and 1200° F., is advantageous in certain cases in order to reduce the extreme conditions of temperature and stress on the reformer furnace tubes. This is an additional feature of my improved process.

With the high steam ratios advocated in my process, the temperature rise in the shift converter (T-1, FIGURE 1) can be less than 100° F., under which circumstances the shift converter can be operated adiabatically, without intermediate quench, for temperature control. This is an added advantage to my process, and under these conditions the shift converter inlet temperature should be maintained in the range of 550° F. to 700° F.

Under certain circumstances it may be advisable to eliminate the waste heat boiler B-2, quenching directly to shift converter inlet temperature and under other circumstances it may be advisable to enrich the air to the secondary reformer R-1 with extra oxygen. My invention encompasses each of these variations.

My improved process is the first one to produce a substantial amount of recoverable heat in the shift converter effluent, beyond the thermochemical requirements for $CO_2$ removal and CO removal. For purposes of this description, I have shown this surplus heat as being used for generation of low pressure steam, but I do not intend to be limited to this application. Another use for the heat would be to provide the energy to run an absorption type ammonia refrigeration system. Refrigeration is frequently used in connection with recovery of anhydrous ammonia from the synthesis system. This particular use of heat from the shift converter effluent stream, or any other convenient use, is encompassed by my invention.

I claim:
1. In the production of ammonia synthesis gas from hydrocarbons by the steps of primary catalytic reforming the hydrocarbons with steam, secondary catalytic reforming with air the product of said primary catalytic reforming, and shift conversion of the product of said secondary catalytic reforming, to produce ammonia synthesis gas containing approximately three moles of hydrogen for each mole of nitrogen, the improvement which comprises maintaining in the primary catalytic reforming step a steam to carbon ratio of 4.0 to 8.0 and maintaining in the secondary catalytic reforming step a pressure between 270 and 650 p.s.i.a.

2. The improvement of claim 1 comprising also the step of recovering heat from the product of the shift conversion step, the amount of heat so recovered being substantially greater than the thermochemical requirements for removal of carbon monoxide and carbon dioxide from said product.

3. The improvement of claim 1 comprising also the step of recovering heat from the product of the shift conversion step, the amount of heat so recovered being substantially greater than the thermochemical requirements for removal of carbon monoxide and carbon dioxide from said product, and the further step of utilizing the recovered heat in excess of said thermochemical requirements to produce refrigeration.

4. The improvement of claim 1 wherein the total conversion of said hydrocarbons after said step of secondary reforming exceeds 95%.

5. The improvement of claim 1 wherein the total conversion of carbon oxides to carbon dioxide after said step of shift conversion exceeds 95%.

6. The improvement of claim 1 wherein the air introduced in said step of secondary reforming is preheated to a temperature of about 300° F. to about 1200° F.

7. The improvement of claim 1 wherein the temperature of said gas immediately prior to the step of shift conversion is from about 550° F. to about 700° F.

8. The improvement of claim 1 wherein the air added to said step of secondary reforming is enriched with added oxygen.

9. In the production of ammonia synthesis gas from hydrocarbons by the steps of primary catalytic reforming the hydrocarbons with steam, secondary catalytic reforming with air the product of said primary catalytic reforming, and shift conversion of the product of said secondary catalytic reforming, to produce ammonia synthesis gas containing approximately three moles of hydrogen for each mole of nitrogen, the improvement which comprises maintaining in the primary catalytic reforming step a steam to carbon ratio of 4.5 to 7.0 and maintaining in the secondary catalytic reforming step a pressure between 290 and 500 p.s.i.a.

References Cited in the file of this patent

UNITED STATES PATENTS

| | | |
|---|---|---|
| 1,921,856 | Wietzel | Aug. 8, 1933 |
| 2,537,708 | Scharmann | Jan. 9, 1951 |
| 2,610,106 | Gray | Sept. 9, 1952 |
| 2,628,890 | Shapleigh | Feb. 17, 1953 |
| 2,699,986 | Buell et al. | Jan. 18, 1955 |
| 2,750,261 | Ipatieff | June 12, 1956 |
| 2,795,559 | Whaley | June 11, 1957 |